United States Patent [19]
Holmberg

[11] Patent Number: 5,162,931
[45] Date of Patent: Nov. 10, 1992

[54] METHOD OF MANUFACTURING FLAT PANEL BACKPLANES INCLUDING REDUNDANT GATE LINES AND DISPLAYS MADE THEREBY

[75] Inventor: Scott H. Holmberg, Pleasanton, Calif.

[73] Assignee: Honeywell, Inc., Minneapolis, Minn.

[21] Appl. No.: 609,576

[22] Filed: Nov. 6, 1990

[51] Int. Cl.$^5$ .................................................. G02F 1/13
[52] U.S. Cl. ........................................ 359/54; 359/59; 359/88; 359/67
[58] Field of Search ....................... 359/54, 58, 59, 87, 359/88, 67; 340/784

[56] References Cited

U.S. PATENT DOCUMENTS

| | | | |
|---|---|---|---|
| 4,820,222 | 4/1989 | Holmberg et al. | 340/784 X |
| 4,822,142 | 4/1989 | Yasui | 359/59 |
| 4,995,703 | 2/1991 | Noguchi | 359/59 |

*Primary Examiner*—Janice A. Howell
*Assistant Examiner*—Huy K. Mai
*Attorney, Agent, or Firm*—Foley & Lardner

[57] ABSTRACT

Flat panel displays are provided with overlying interconnected and hence redundant bus lines to reduce fatal defects. The redundant, generally row lines are interconnected at least at two locations on a line and can be connected at each pixel to further reduce defects. The redundant row or gate line is formed by an overlying light shield line which preferably is of low resistivity and enhances the operation of the displays. The display can include subdivided subpixels and one defective subpixel is generally an acceptable non-fatal display defect, since the rest of the subpixels are still operative. The subpixels can be formed with common or redundant column bus lines.

18 Claims, 11 Drawing Sheets

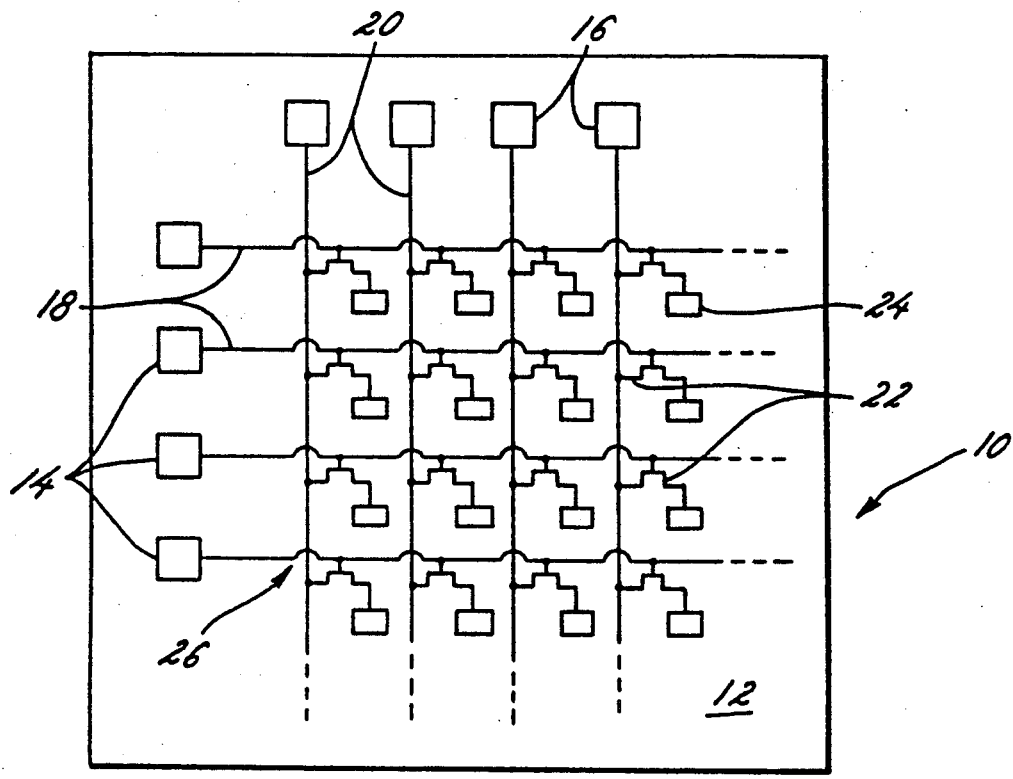
FIG. 1
PRIOR ART
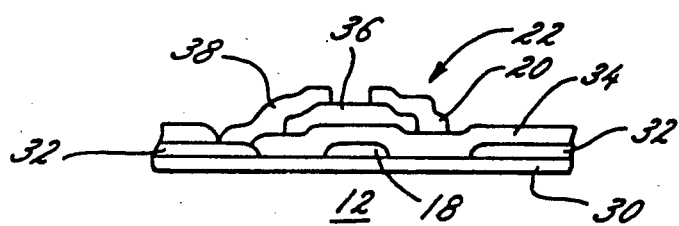
FIG. 2
PRIOR ART
FIG. 3
PRIOR ART
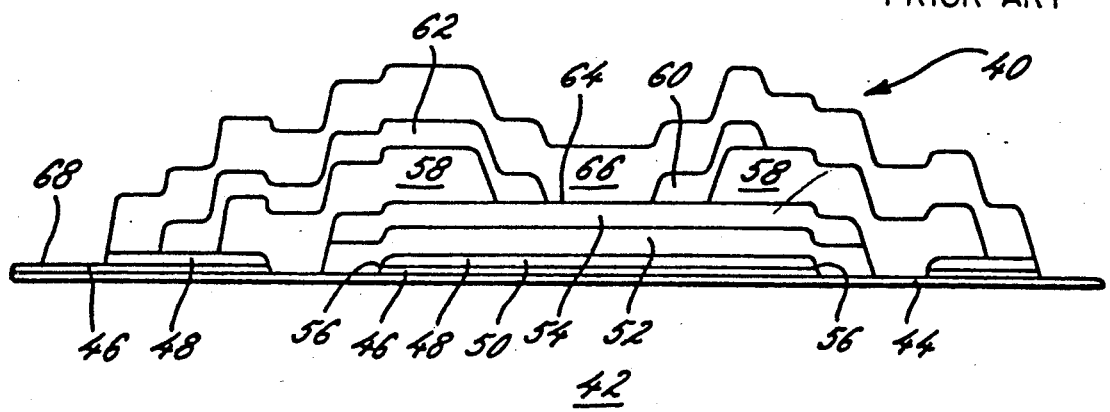

METHOD OF MANUFACTURING FLAT PANEL BACKPLANES INCLUDING REDUNDANT GATE LINES AND DISPLAYS MADE THEREBY

BACKGROUND OF THE INVENTION

The present invention pertains to improved flat panel displays and methods of making the displays with redundant gate lines. More particularly, the present invention is directed to methods of increasing the manufacturing yields of flat panel display backplanes and the displays made therefrom while maintaining display area and improving operating characteristics.

In recent years there has been growing interest in flat panel displays, such as those which employ liquid crystals, electrochromic or electroluminescence, as replacements for conventional cathode ray tubes (CRT). The flat panel displays promise lighter weight, less bulk and substantially lower power consumption than CRT's. Also, as a consequence of their mode of operation, CRT's nearly always suffer from some distortion. The CRT functions by projecting an electron beam onto a phosphor-coated screen. The beam will cause the spot on which it is focused to glow with an intensity proportional to the intensity of the beam. The display is created by the constantly moving beam causing different spots on the screen to glow with different intensities. Because the electron beam travels a further distance from its stationary source to the edge of the screen than it does to the middle, the beam strikes various points on the screen at different angles with resulting variation in spot size and shape (i.e distortion).

Flat panel displays are manufactured to be substantially free of such distortion. In the manufacture of flat panel displays the circuit elements are deposited and patterned, generally by photolithography, on a substrate, such as glass. The elements are deposited and etched in stages to build a device having a matrix of perpendicular rows and columns of circuit control lines with a pixel contact and control element between the control line rows and columns. The pixel contact has a medium thereon which is a substance that either glows (active) or changes its response to ambient light (passive) when a threshold voltage is applied across the medium control element. The medium can be a liquid crystal, electroluminescent or electrochromic materials such as zinc sulfide, a gas plasma of, for example, neon and argon, a dichroic dye, or such other appropriate material or device as will luminesce or otherwise change optical properties in response to the application of voltage thereto. Light is generated or other optical changes occur in the medium in response to the proper voltage applied thereto. Each optically active medium is generally referred to as a picture element or "pixel".

The circuitry for a flat panel display is generally designed such that the flat panel timeshares, or multiplexes, digital circuits to feed signals to one row and one column control line of the pixels at a time. Generally one driving circuit is used for each row or column control line. In this way a subthreshold voltage can be fed to an entire row containing hundreds of thousands of pixels, keeping them all dark or inactive. Then a small additional voltage can be supplied selectively to particular columns to cause selected pixels to light up or change optical properties. The pixels can be made to glow brighter by applying a larger voltage or current of a longer pulse of voltage or current. Utilizing liquid crystal displays (LCD's) with twisted nematic active material, the display is substantially transparent when not activated and becomes light absorbing when activated. Thus, the image is created on the display by sequentially activating the pixels, row by row across the display. The geometric distortion described above with respect to CRT's is not a factor in flat panel displays since each pixel sees essentially the same voltage or current.

One of the major problems that arises with respect to the prior art method of manufacture of backplanes for active matrix displays (e.g. those employing thin film transistors at each pixel) is that they generally suffer production yield problems similar to those of integrated circuits. That is, the yields of backplanes produced are generally not 100% and the yield (percentage of backplanes with no defects) can be 0% in a worst case. High quality displays will not tolerate any defective pixel transistors or other components. Also, larger size displays are generally more desirable than smaller size displays. Thus, a manufacturer is faced with the dilemma of preferring to manufacture larger displays, but having to discard the entire product if even one pixel is defective. In other words, the manufacturer suffers a radically increased manufacturing cost per unit resulting from decreasing usable product yield.

One solution to the low yeild problem is disclosed in U.S. Pat. No. 4,820,222, entitled "Method of Manufacturing Flat Panel Backplanes Including Improved Testing and Yields Thereof and Displays Made Thereby", which is owned by the assignee of the present application and is incorporated herein by reference.

These problems of increased cost and decreased yield are improved in the present invention by providing methods of manufacturing display backplanes and the resulting displays with redundant gate lines which provide a greatly reduced number of fatal defects while maintaining active display area and enhancing the display operation.

SUMMARY OF THE INVENTION

There is provided improved methods of manufacturing backplanes and the resulting flat panel displays to increase the manufacturing yield, decrease manufacturing costs and decrease the number of fatal display defects while maintaining active display area and improving the display performance.

These improvements primarily are accomplished by a redundant gate line formed vertically by forming an overlying light shield line over each row (gate) line. The overlying gate line is connected at least at two locations on each row line. The gate lines are thus on both sides of the active semi-conductor material of the transistors, separated by insulating layers, which assures better on and off characteristics for the transistors. This provides a redundant gate line without decreasing the active viewing area of the resulting display. The light shield can be formed from an aluminum alloy which also has the advantage of reducing the gate line resistance.

Each of the backplanes and hence display pixels also can be subdivided into two or more subpixels. Each subpixel can be formed with its own column (source) bus line, but includes a joint row (gate) line. Each subpixel pair of bus column lines can be connected at the opposite sides of the display to provide redundant bus column lines, if desired. A break in the column bus line therefore also will not affect the operation of the display, because the pixel will receive current from the other interconnected end of the column bus line. Further, by providing subpixels, a defective active device at a subpixel will result in less than the whole pixel being defective and hence can be an acceptable non-fatal defect increasing the display yields. Subpixels also can be formed with a common column bus line, if desired. The redundant line also could be the column bus line if the structure is formed with the column bus line deposited first, instead of the row line.

BRIEF DESCRIPTION OF THE DRAWINGS

FIG. 1 is a plan view schematic representation of an active matrix display backplane made by a prior art method;

FIG. 2 is a cross-section of one transistor of the prior art backplane which could be utilized with the present invention, with a passivation layer first formed thereover;

FIG. 3 is a cross-section of one transistor which could be utilized with the present invention;

DESCRIPTION OF THE PREFERRED EMBODIMENTS

Figure 4:
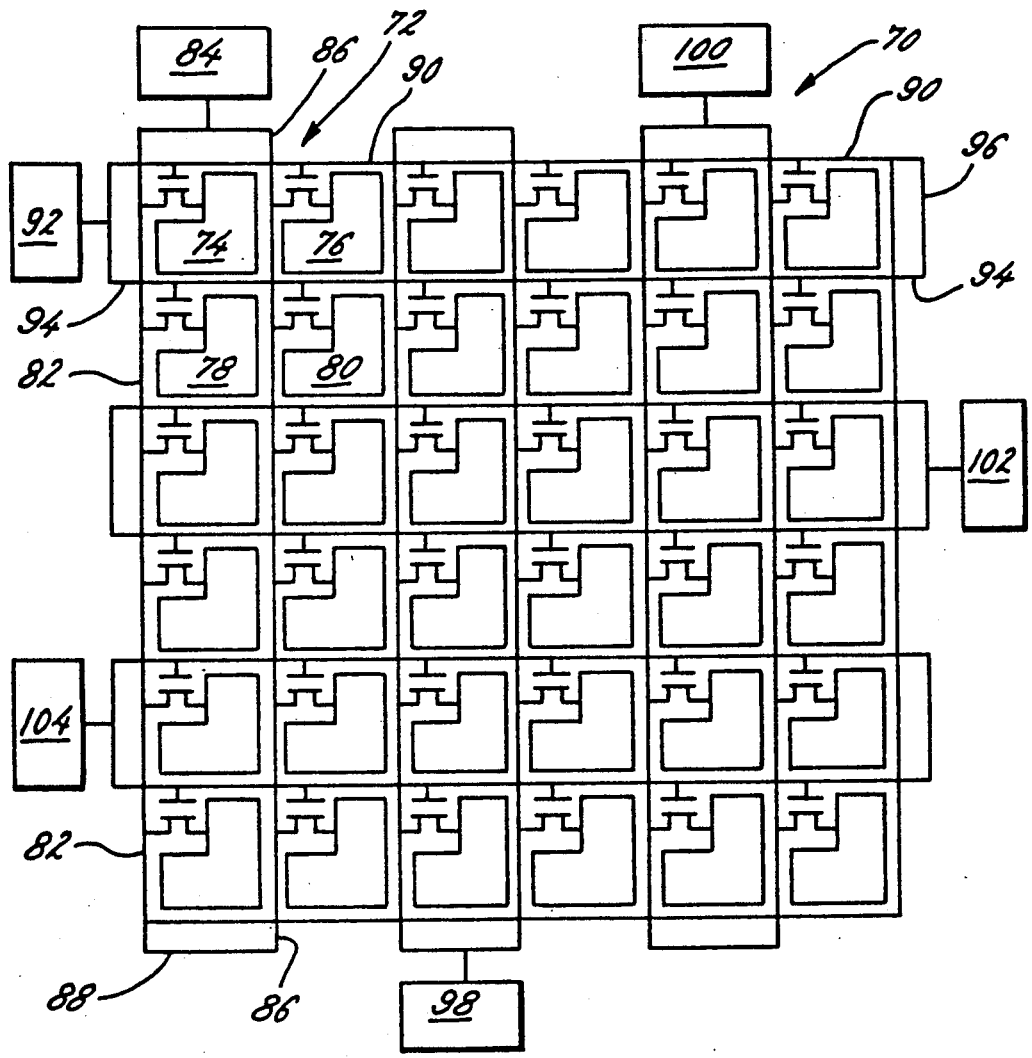
FIG. 4 is a plan view schematic representation of one prior embodiment of a subpixel matrix display.

Referring now more particularly to FIG. 1, there is shown a schematic representation of an active matrix flat panel display device 10 made in accordance with conventional photolithographic techniques. One such device 10 and the manufacture thereof is more fully described in Application of Amorphous Silicon Field Effect Transistors in Addressable Liquid Crystal Display Panels, A. J. Snell, et al., *Applied Physics*, No. 24, p. 357, 1981. The device 10 includes a substrate 12, sets of contact pads 14 and 16, sets of control or bus lines 18 and 20, and, in this particular example of the prior art, transistors 22 and pixel back contacts 24.

The substrate 12 commonly employed in these devices is formed from glass. The control lines 18 and 20 are organized into a matrix of rows 18 and columns 20. The control line rows 18 in this device 10 serve as gate electrodes and the control line columns 20 as source connections. One contact pad 14 is connected to one end of each of the row control lines 18. One contact pad 16 is connected to one end of each of the column control lines 20. The display drive control (not shown) is connected to the sets of pads 14 and 16.

At each matrix crossover point 26, where a row line 18 and a column line 20 cross, a switching element, transistor 22 is formed to connect the row line 18 and column line 20 to the pixel back contacts 24. The active medium covers at least the contacts 24 which will optically change properties in response to the combined voltages or currents in the respective crossover point 26 formed by the row 18 and column 20. The active medium at a given crossover point 26 will appear as a square or dot in the overall checkerboard type matrix of the display 10. The actual size of the transistors 22 and the contacts 24 are not drawn to scale, but are shown schematically for illustration only.

It should be noted that theoretically there is no limit on the number of rows 18 and columns 20 that can be employed, only a portion of which are illustrated in FIG. 1. Therefore, there is also no theoretical limit on the outside dimensions of such a device 10. However, the present state of the lithographic art places a practical limit on the outside dimensions of these devices. The present alignment techniques generally allow high resolution display devices to be manufactured approximately five inches on a side, although improved techniques of up to fourteen inches on a side have been demonstrated.

The problem encountered by the prior art method of manufacture is that if the array of device 10 contains any defective pixel transistors 22 or other circuit elements causing a pixel to be inoperative, it must be discarded.

Referring in detail to FIG. 2, several problems occur when the switching element, transistor 22 is manufactured. The substrate 12 is a substantial portion of the backplane cost and hence an inexpensive soda-lime glass is generally utilized. It has been demonstrated by liquid crystal display manufacturers that the high sodium concentration can poison the liquid crystal material by diffusing through the overlying ITO layer and hence an $SiO_2$ suppression layer 30 is generally formed on the substrate 12. There are some high quality low sodium types of substrates available, which would not need the suppression layer 30. An ITO layer 32 is formed and etched to provide an ITO free area on which the gate 18 is deposited. Following the deposition of the gate 18, a gate insulator layer 34 is deposited. Although a smooth uniform coverage of the gate 18 by the insulator 34 is illustrated, in production the gate 18 has or can have sharp edges which lead to pin holes or thinning of the insulator 34 at the gate edges. The source and drain metals can short to the gate 18. The thinning or pin holes produce transistors 22, which if operative, do not have uniform operating characteristics and hence the backplane is worthless.

One attempt to solve this problem, is to make the gate 18 very thin, but the resistivity is then too high to make the large arrays necessary for the backplane. A second attempt to solve the problem, is to make the gate insulator 34 very thick, but this decreases the gain of the transistor 22 and is also self defeating.

An amorphous silicon layer 36 then is deposited, with the source 20 and a drain 38 deposited thereover. A passivating layer (not shown) would be deposited over the completed structure to complete the transistor 22. During operation, the activation of the source 20 and the gate 18 couples power through the silicon alloy 36 to the drain and hence to the contact pad 24 formed by the ITO layer 32.

Referring now to FIG. 3, there is shown a cross-section of one embodiment of a transistor 40 which can be utilized with the present invention. The transistor is more fully disclosed in U.S. Pat. Nos. 4,545,112 and 4,736,229, which are incorporated herein by reference.

A glass substrate 42 includes a barrier $SiO_2$ layer 44 thereon. As above mentioned, a low sodium glass substrate, such as Corning 7059 glass, could be utilized, and hence the barrier layer 44 can be eliminated. The detailed deposition steps are described in the above-referenced patents. An ITO layer 46 is deposited and then a refractory metal layer 48 is deposited on the ITO layer 46.

The layers 46 and 48 are etched to form a gate electrode 50. A gate insulator 52 and a semiconductor material 54 are sequentially deposited over the gate 50. The material 54 preferably is an amorphous silicon alloy. To avoid the possibility of any gate to source or drain shorts at gate edges 56, a dielectric 58 is deposited over the gate 50, the gate insulator 52 and the semiconductor 54. The dielectric 58 is deposited to a sufficient thickness to ensure that no shorts or thin spots are formed between the edges 56 of the gate 50 and a source 60 and a drain 62 deposited thereover.

The dielectric 58 is etched away only on a substantially planar central region 64 of the semiconductor layer 54. This insures uniform operating characteristics for the transistors 40 in the backplane array. A passivating layer 66 is deposited over the whole structure to complete the structure of the transistor 40.

During all of the transistor processing steps, the refractory metal layer 48 remains over a pixel contact pad 68 upon which the active medium of the pixel will be formed. As a final step, before the active medium (not shown) is added to the backplane to complete the display, the refractory metal is etched off of the pixel pad 68 leaving the ITO layer 46 exposed after all the processing has been completed.

Referring now to FIG. 4, a subpixel matrix display of the above-referenced U.S. Pat. No. 4,820,222, is designated generally by the reference numeral 70. The subpixel matrix display 70 is illustrated as having each pixel subdivided into four subpixels, but the pixels could be subdivided into numerous other configurations such as two subpixels, two by four or six subpixels or in three subpixels for color applications. Each pixel 72 is subdivided into four subpixels 74, 76, 78 and 80 (only one pixel 72 is so numbered for illustration). As previously stated, the number of pixels is merely shown for illustration purposes and the display 70 could contain any desired number and configuration, square or rectangular.

A column (source) line or bus 82 connects the subpixels 74 and 78 and all other column subpixel pairs in one-half of each of the pixels to a column or source contact pad 84 at one edge of the display 70. A second column (source) line or bus 86 connects the subpixels 76 and 80 and all other column subpixel pairs in the second half of each of the pixels to the column or source contact pad 84. The bus lines 82 and 86 are interconnected (shorted) at or before the pad 84 and are interconnected (shorted) at the opposite ends by a line or short 88.

A row (gate) line or bus 90 connects the subpixels 74 and 76 and all other row subpixel pairs in one-half of each of the pixels to a row (gate) pad 92. A second row (gate) line or bus 94 connects the subpixels 78 and 80 and all other row subpixel pairs in one-half of each of the pixels to the row pad 92. The bus lines 90 and 94 are interconnected (shorted) at or before the pad 92 and are interconnected (shorted) at the opposite ends by a line or short 96.

In a like manner, each of the other subpixel pairs are connected in columns to respective column (source) pads 98 and 100, etc. The pads 84, 98 and 100 are illustrated as being on opposite sides of the display to provide additional connecting space for the pads, however, they also could all be on one side as in the display 10. Each of the other subpixel pairs also are connected in rows to respective row (gate) pads 102 and 104, etc.

The pixel 72 then is divided into four subpixels 74, 76, 78 and 80 which allows for one of the subpixels to be defective, such as the subpixel 74, without causing a fatal defect, since the remaining three subpixels 76, 78 and 80 remain operative. In prior devices, the pixel 72 would be totally defective and hence the display 70 would be inoperable.

Further, one often fatal display defect is caused by a defect or open in one of the row or column bus lines which would cause the whole row or column to be out, again resulting in an inoperative display 70. With the respective subpixel pairs or row and column bus lines interconnected, however, an open in a bus line will at most cause one subpixel to be inoperative. An open in one or more of the bus lines between the subpixels will result in no defects, since the current is supplied from the opposite shorted end of the row or column bus line. Thus, the display 70 in effect has redundant row and column bus lines.

To avoid the fatal defect of the multiple open lines, as also disclosed in U.S. Pat. No. 4,820,222, the redundant row and column bus lines can be further interconnected at each subpixel. Each pair of the column bus lines 82 and 86 are additionally interconnected between each of the subpixels 74, 78, etc. by respective lines or shorts. In a like manner, each pair of the row bus lines 90 and 94 are interconnected between each of the subpixels 74, 76, etc. by respective lines or shorts. Further, although both the row bus lines and the column bus lines can be interconnected between each subpixel, only one of the row or the column bus line sets might be shorted to limit the loss of active pixel display area.

Figure 5:
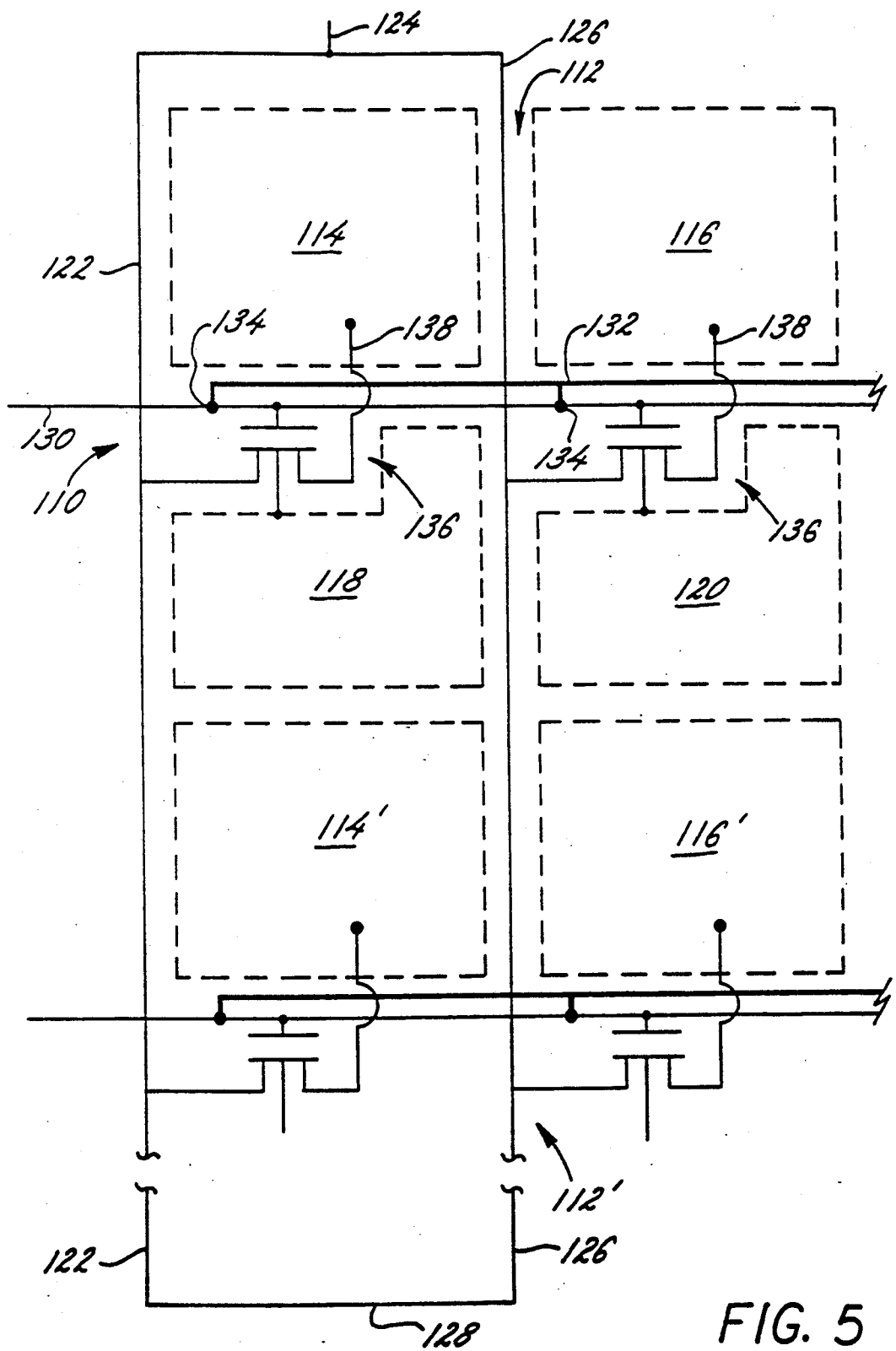
FIG. 5 is a plan view schematic representation of one embodiment of a subpixel matrix display of the present invention.

Referring now to FIG. 5, a subpixel matrix display of the present invention is designated generally by the reference numeral 110. The subpixel matrix display 110 again is illustrated as having each pixel 112 subdivided into four subpixels 114, 116, 118 and 120 (only one pixel 112 and a part of pixel 112' is so numbered for illustration). The pixels, however, need not be subdivided or can be subdivided into numerous other configurations such as two subpixels, two by four or six subpixels or in three subpixels for color display applications. Also, as previously stated for the subpixel matrix display 70, the number of pixels can be of any number and configuration, square or rectangular. As stated, and most importantly, the redundant bus lines of the present invention can be utilized with any type of conventional pixel display, formed with or without subpixels. A column (source) line or bus 122 connects the subpixels 114 and 118 and all other of the same column subpixel pairs to a column or source contact line 124 at one edge of the display 110. A second column (source) line or bus 126 connects the subpixels 116 and 120 and all other of the same column subpixel pairs to the line 124. The bus lines 122 and 126 are interconnected (shorted) at or before the line 124 and are interconnected (shorted) at the opposite ends by a line or short 128 to provide the redundant column lines.

The subpixel matrix display 110 again is provided with a redundant structure for a row (gate) line 130, which in this embodiment of the invention, connects all four subpixels 114, 116, 118 and 120 and all other of the same row subpixels to the line 130. This embodiment avoids utilizing as much active viewing area of the subpixel matrix display 110 as is utilized by the lateral spaced dual row line subpixel matrix display 70. The redundant gate line structure is provided by an overlying light shield 132 which is formed vertically over the gate line 130, diagrammatically illustrated in FIG. 5 and best illustrated in FIGS. 6 and 7.

The light shield or redundant gate line 132 includes an interconnection or short 134 at least at two locations on the line 130 and conveniently at each pixel 112. The shorts 134 can be provided at each transistor 136, as illustrated, if desired. Preferably, the line 132 is formed from an aluminum alloy, which greatly decreases the resistance of the gate line. The gate line 130 most typically is formed from a NiCr alloy which has a high resistance on the order of 20–30,000 ohms. The addition of the aluminum alloy line reduces the resistance to on the order of 1,000 ohms.

Figure 6:
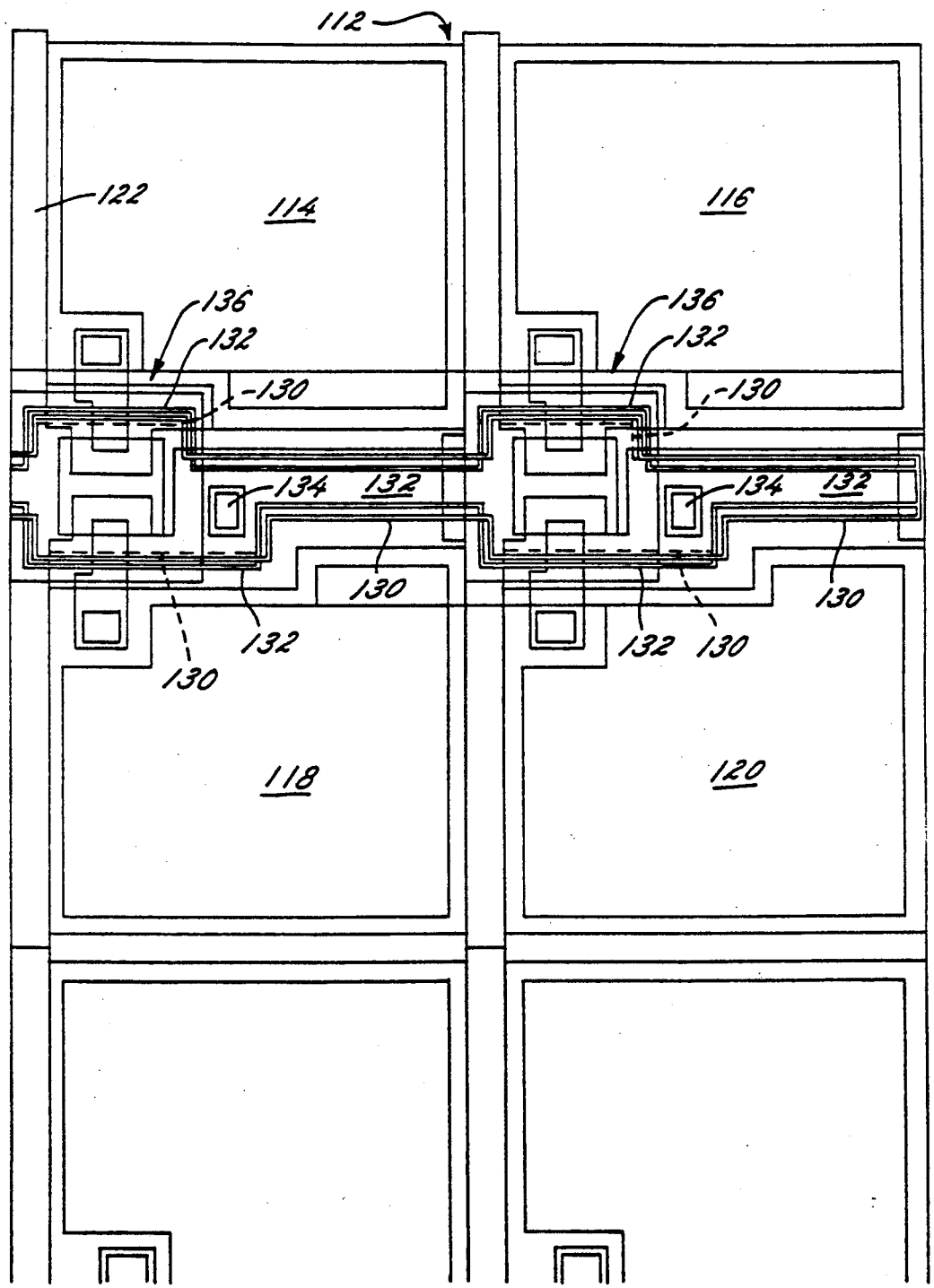
FIG. 6 is a plan view of a portion of one embodiment of a subpixel matrix display illustrating the subpixel row and column bus lines in accordance with the present invention.
Figure 7:
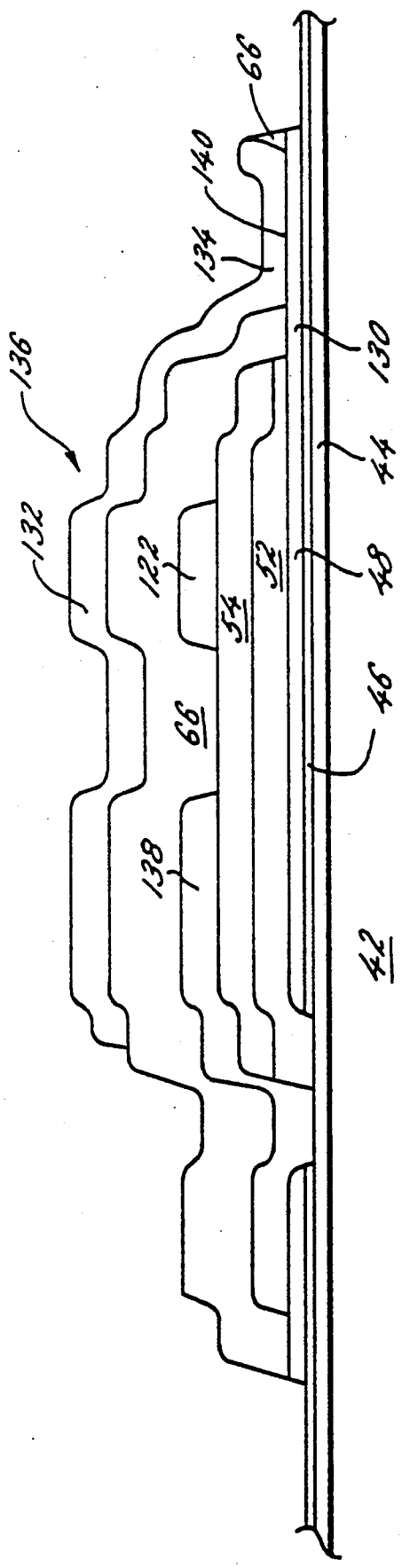
FIG. 7 is a cross-section of a transistor illustrating the redundant row bus lines of the present invention.

To drive each of the subpixels 114, 116, 118 and 120, each one of a plurality of transistors 136 includes a second drain line connection 138 which, for example, additionally connects the subpixel 114 to the same transistor 136 as the subpixel 118. This arrangement thus connects a pair of the subpixels 114, 118 and 116, 120 on opposite sides of the line 130 to each transistor 136. The subpixels 114 and 116 are not reduced in size for additional transistor structures. Further, the adjacent pixels 112 and 112' do not have a gate line between adjacent subpixels 118, 114' and 120, 116'. Thus, this gate line structure provides the desired redundancy, does not utilize more active area than a single gate line display, enhances the display operation and also provides a light shield for the transistor active areas as best illustrated in FIGS. 6 and 7. Also, as previously stated, the redundancy can be provided in the source line with a reverse type structure.

Referring first to FIG. 6, one overall plan layout embodiment of the pixel 112, the subpixels 114, 116, 118 and 120 is best illustrated. The gate line 130 is wider than the light shield 132 between the transistors 136, while the light shield 132 is wider than the gate line 130 over the structure of each of the transistors 136 to ensure that the light sensitive amorphous silicon active areas are shielded from any impinging light. The transistors 136 include a drain line connected to a pair of subpixels, for example, 114 and 118. The interconnections or shorts 134 are formed by cutting or etching vertically through the dielectric 66 of the transistor 136, as best illustrated in FIG. 7.

The transistor 136 is substantially identical to the transistor 40 and the same numerals are utilized for the identical elements. The transistor 136 does not include the dielectric 58, but can be so constructed if desired. The passivation layer or dielectric 66 is etched through to the gate 130 (50) in an area 140 and the light shield 132 then is deposited, with the portion in the area 140 forming the short 134.

As illustrated in FIG. 7, the light shield or overlying redundant gate line 132 overlaps both the gate 130 and the active semiconductor area 54. This effectively places the same field on both sides of the semiconductor area 54, which increases conduction when the transistor 136 is turned on and decreases possible leakage conduction when the transistor 136 is turned off. Thus, by providing a light shield, since the amorphous silicon material is light sensitive and enhancing the transistor turn on and turn off characteristics, the redundant gate line 132 also enhances the operation of the resulting display.

It is desirable to provide as high a manufacturing yield as possible, and a further enhanced redundant gate line structure 142 is best illustrated in FIGS. 8A–8F. Each of the transistors 136 illustrated in FIGS. 5 and 6, includes the second drain line 138 to operate two subpixels, such as 114 and 118, from each of the transistors. One manufacturing defect, which can be corrected, is a source line 122 to gate line 130 short. In the transistor structure 136, both subpixels 114 and 118 will be opened when the transistor 136 is opened, such as by opening the lines 130 and 132 with a laser on both sides of the transistor 136. It thus can be desirable to form the transistor structure such that only one subpixel is lost if a gate to source short occurs.

Figure 8A:
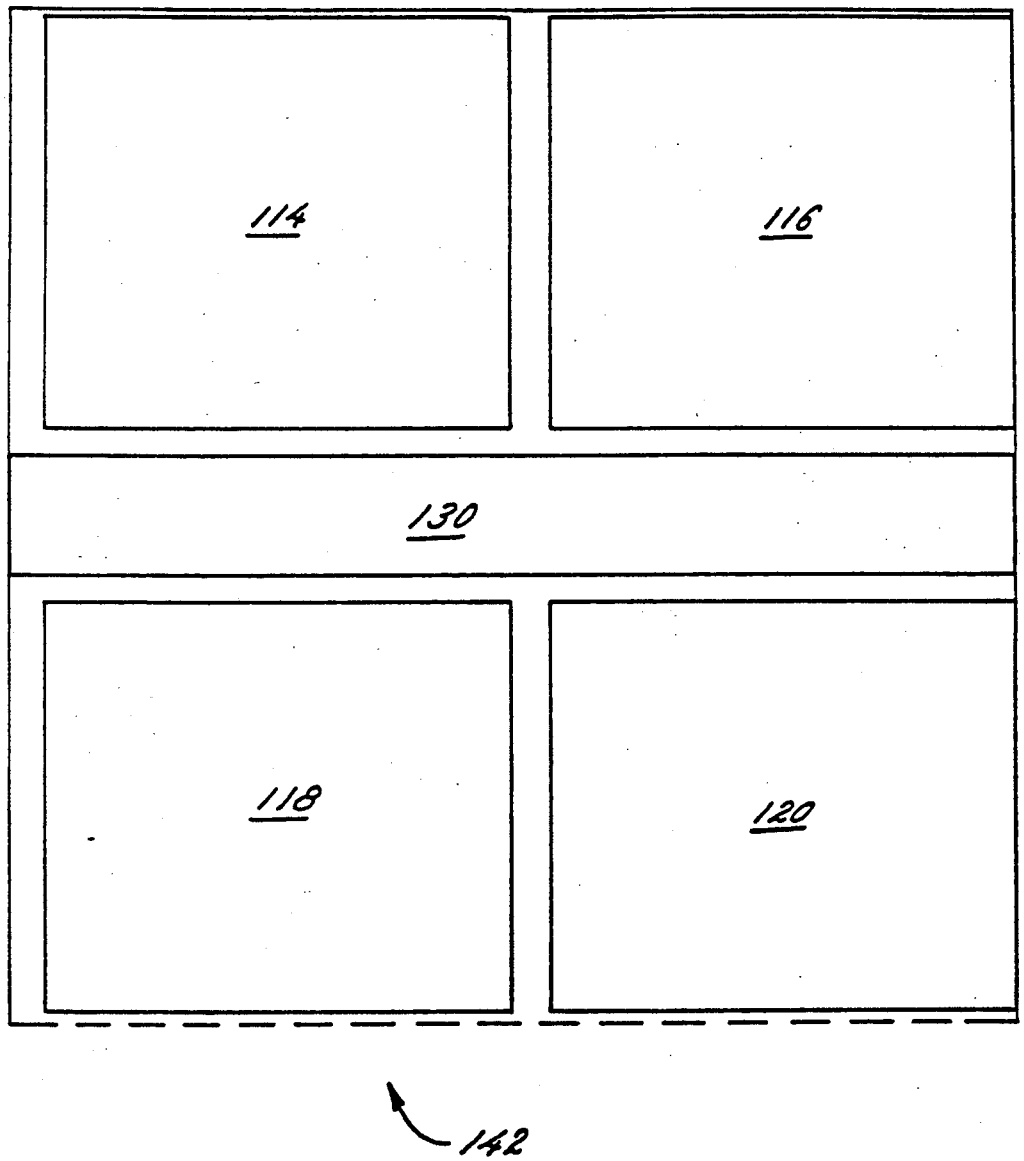
FIGS. 8A-8F are plan views of the elements of a second embodiment of a subpixel matrix display of the invention.
Figure 8B:
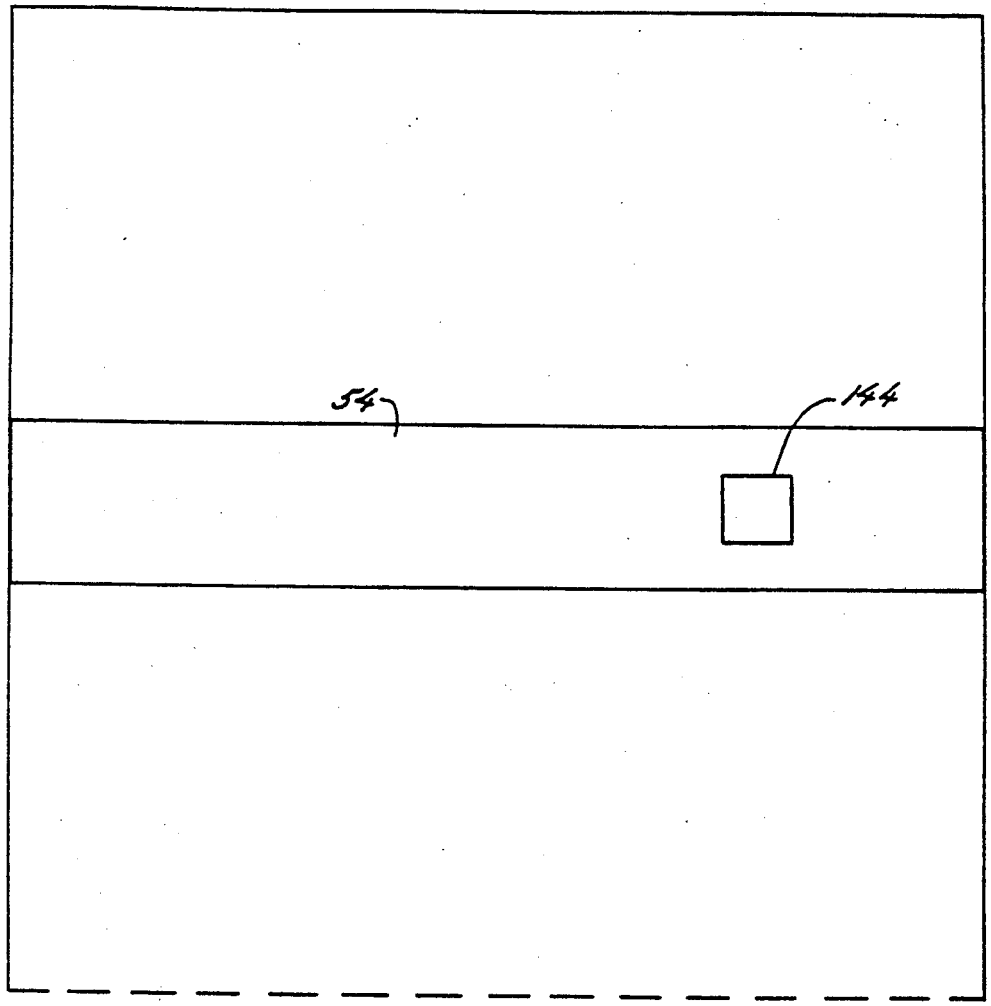

Referring to FIG. 8A, the structure 142 includes the bottom gate line 130, which can be formed by the ITO layer 46 and the NiCr alloy layer 48. The line 130 is only shown for one pixel, but would continue across the width of the display. The metal forming the bottom layer or pad of the subpixels 114, 116, 118 and 120 also is formed with the gate line metal. The gate insulator layer 52, such as formed from silicon nitride, and the amorphous silicon alloy layer 54 then are formed over the gate line 130, as illustrated in FIG. 8B. An opening 144 is etched or otherwise formed through the layers 52 and 54 to provide the contact area to the gate 130.

Figure 8C:
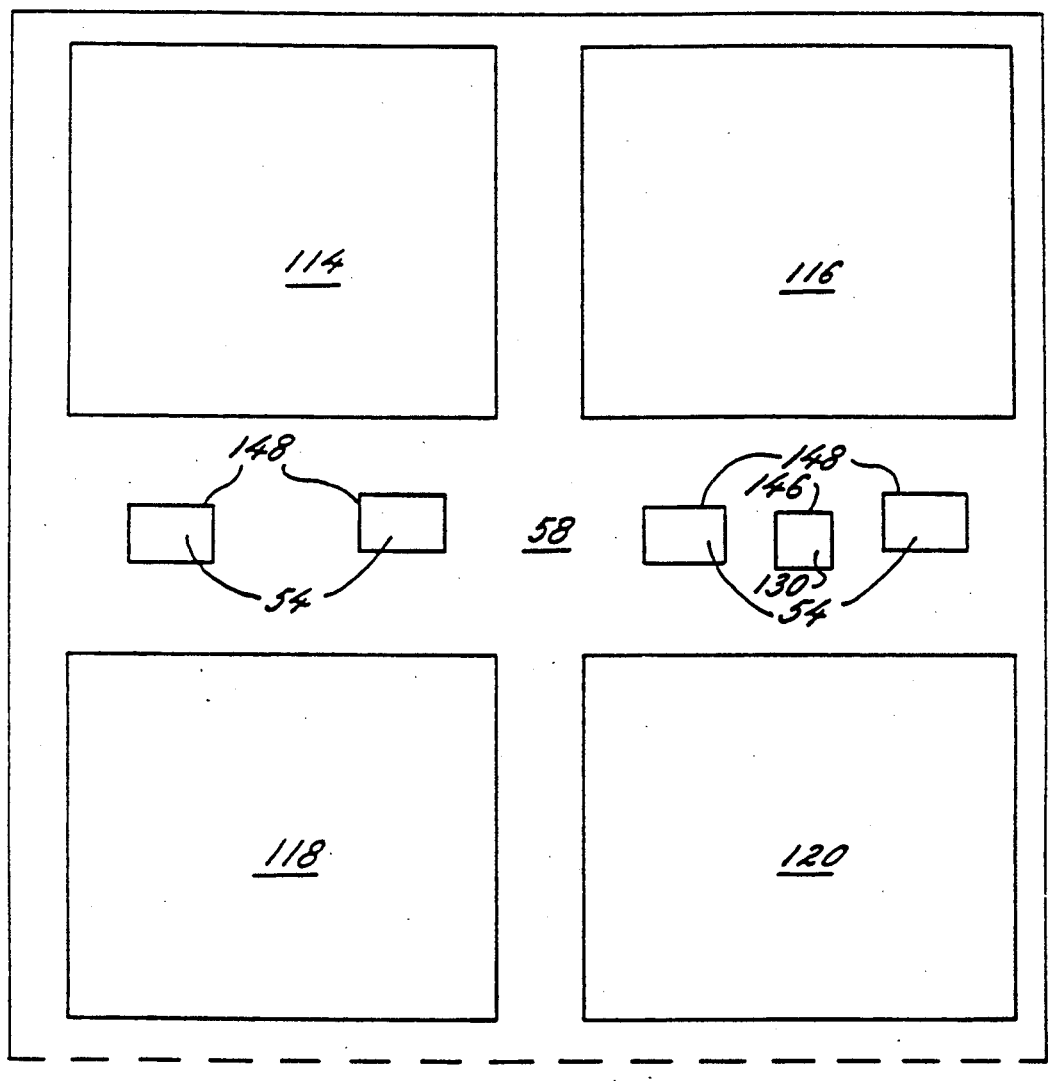

Next, as illustrated in FIG. 8C, the dielectric layer 58 is deposited, such as silicon dioxide, which again is etched through to form an access opening 146 to the gate 130. Four active transistor areas 148 are etched through the layer 58 to the semiconductor layer 54. The subpixels 114, 116, 118 and 120 also are etched to their metal bottom layer.

Figure 8D:
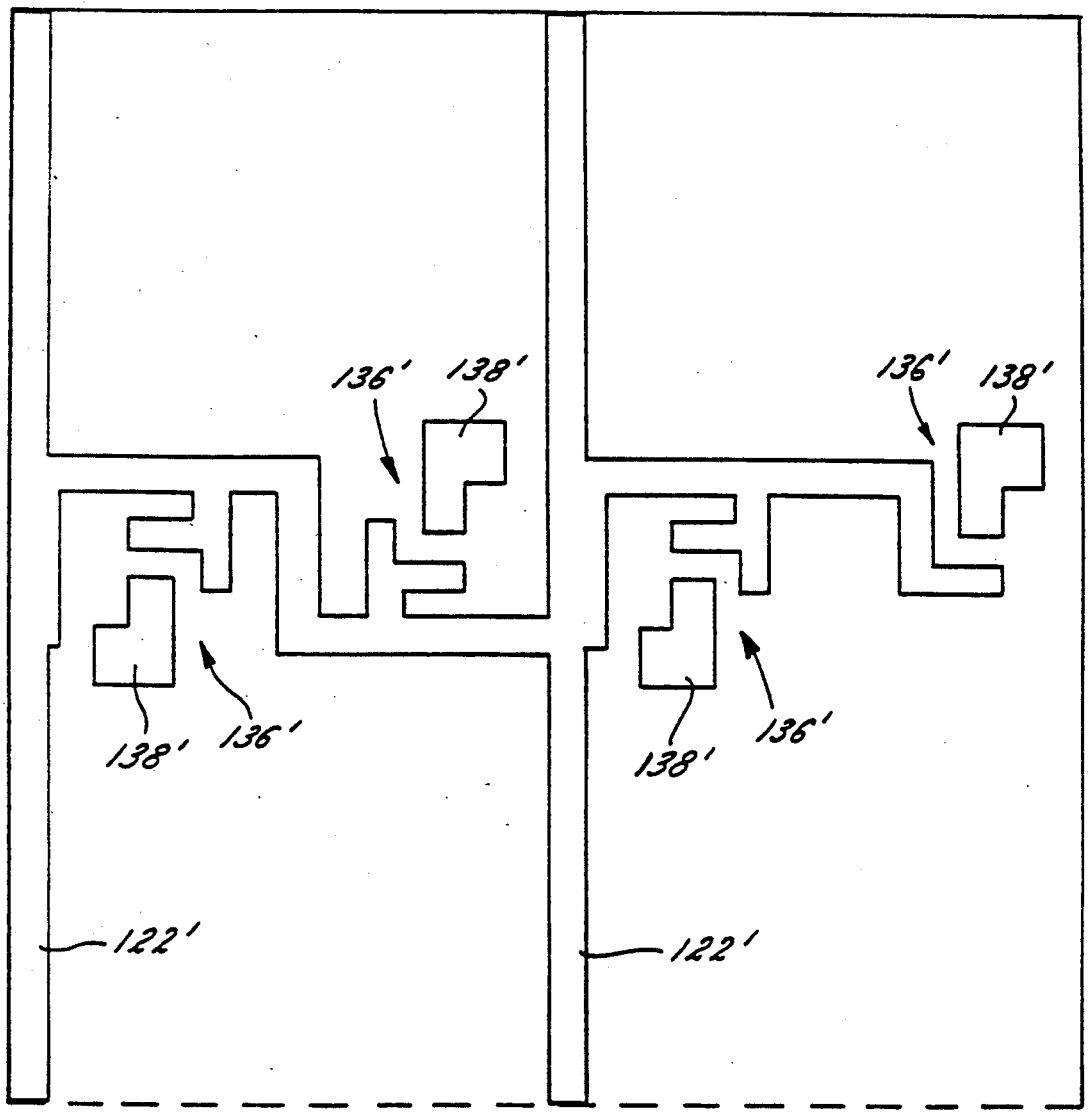

Referring to FIG. 8D, the source and drain metals 122' and 138' are deposited to contact the active areas 54. Each source line 122' and each drain line 138' is connected to separate areas 54 for each of the four subpixels 114, 116, 118 and 120. In this case, four separate transistors 136' will be formed at the active areas 54. This structure provides the advantage of opening each transistor or each subpixel in the case of source to gate shorts, without deactivating any of the other subpixels.

Figure 8E:
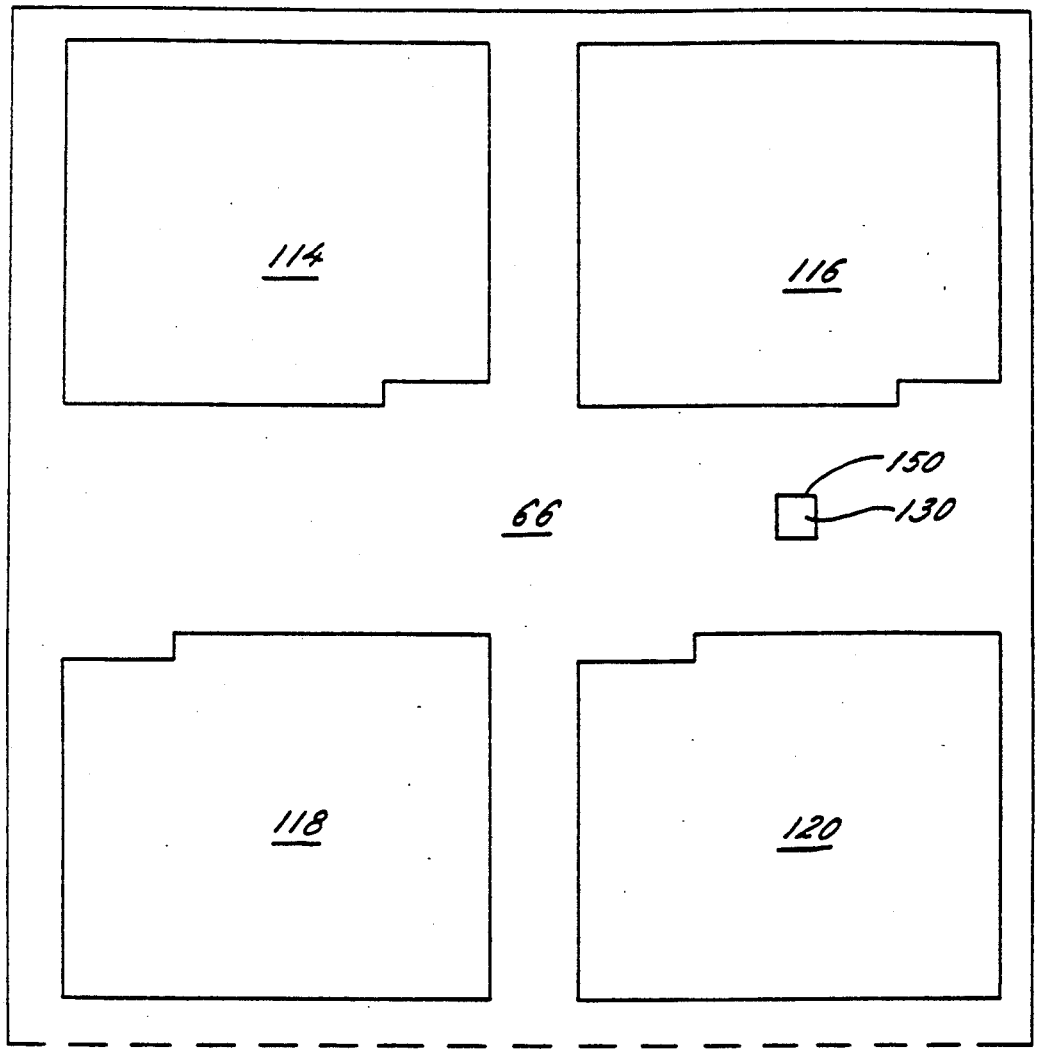
Figure 8F:
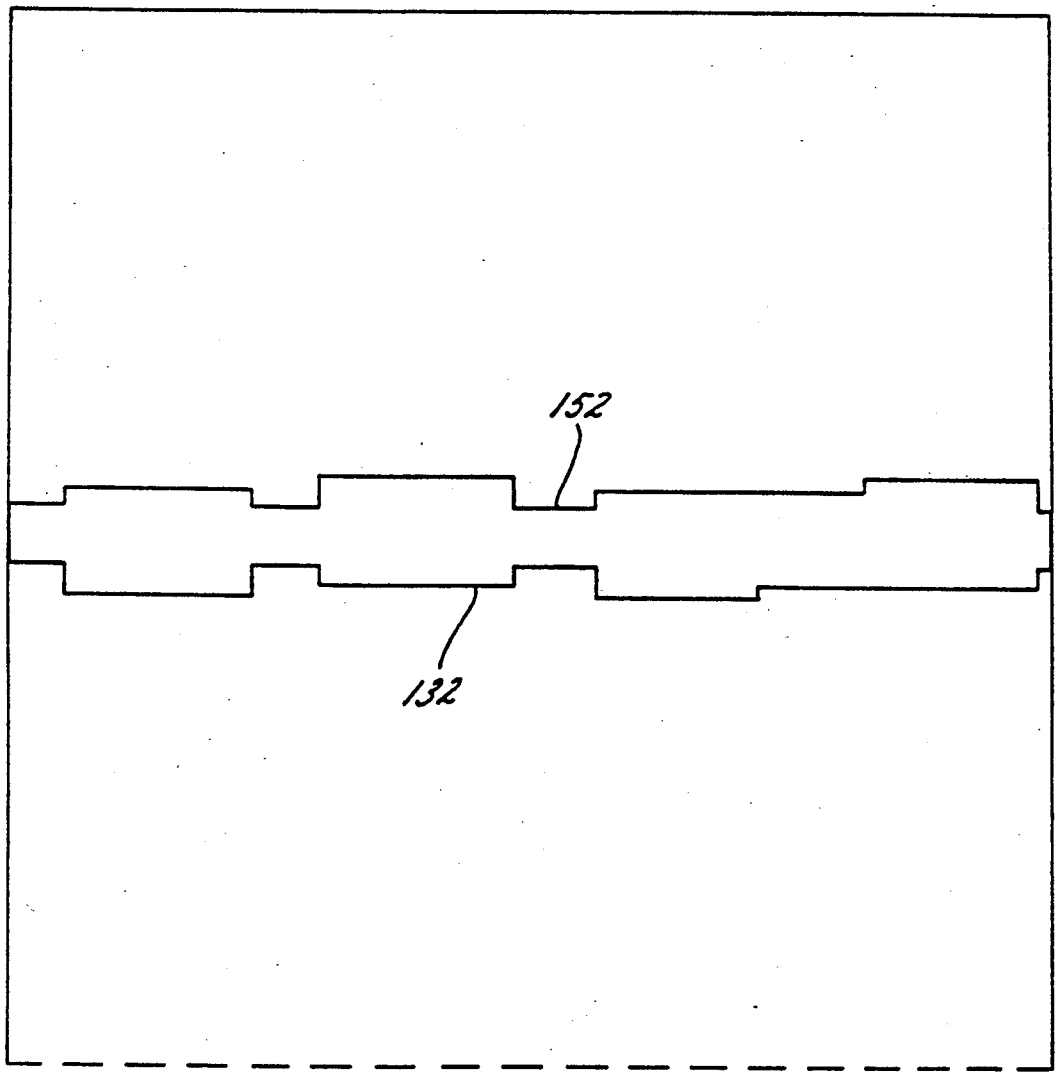

Referring to FIG. 8E, the passivation layer 66 is formed on the structure and then another access opening 150 is opened to the gate line 130. Finally, as illustrated in FIG. 8F, the overlying light shield/gate line 132 is formed, preferably from a low resistivity aluminum alloy, such as 98% aluminum with 2% copper. The line 132 preferably includes a narrow region 152 to minimize capacitance between the gate line 132 and the source line 122.

Modifications and variations of the present invention are possible in light of the above teachings. The transistors 22 or other types of two or three terminal switching devices can be utilized with the invention. The amorphous silicon alloy semiconductor material 54, could be any of numerous types of materials such as CdSe or GaAs materials. The gate lines 130 and 132 are illustrated interconnected or shorted at each pixel or each subpixel, but can be connected just at the ends of the display or with another pattern, such as every other pixel. It is therefore to be understood that within the scope of the appended claims, the invention may be practiced otherwise than as specifically described.

What is claimed and desired to be secured by Letters Patent of the United States is:

1. A method of manufacturing matrix display backplanes and displays therefrom, comprising:
   providing a substrate;
   forming a pattern of pixels on said substrate;
   forming a plurality of row and column intersecting activation bus lines including forming redundant pairs of each one of said plurality of row or column activation bus lines, including forming each said redundant pair of activation bus lines overlying but spaced from one another, interconnecting each redundant pair of activation bus lines one to another at least twice on each pair of lines; and
   coupling each said pixel to at least one of said row and one of said column intersecting bus lines to provide each pixel with a set of activation bus lines.

2. The method as defined in claim 1 including interconnecting each of said redundant pair of activation bus lines at least at each of said pixels.

3. The method as defined in claim 1 including forming said overlying activation bus lines from a low resistivity aluminum alloy.

4. The method as defined in claim 1 including providing an active switching device for each pixel and coupling said pixel to said row and column intersecting bus lines with said device.

5. The method as defined in claim 4 including forming said redundant pair of activation bus lines overlying each said device to provide a light shield therefor and to enhance the operation thereof.

6. The method as defined in claim 4 including subdividing each of said pixels into at least two subpixels and coupling each said subpixel in pairs to at least one of said row and one of said column intersecting bus lines with said device.

7. The method as defined in claim 1 including subdividing each of said pixels into at least two subpixels and coupling each said subpixel in pairs to at least one of said row and one of said column intersecting bus lines.

8. The method as defined in claim 7 including providing a redundant pair of row activation bus lines for each of said subpixels.

9. The method as defined in claim 8 including interconnecting at least one pair of said row lines at each of said pixels.

10. A display backplane, comprising:
    a substrate;
    a pattern of pixels formed on said substrate;
    a plurality of row and column intersecting activation bus lines formed on said substrate including redundant pairs of each one of said plurality of row or column activation bus lines, each said redundant pair of activation bus lines formed overlying but spaced from one another, interconnected to one another at least twice on each pair of lines; and
    each said pixel coupled to at least one of said row and one of said column intersecting bus lines to provide each pixel with a set of activation bus lines.

11. The backplane as defined in claim 10 including each of said redundant pair of activation bus lines interconnected at least at each of said pixels.

12. The backplane as defined in claim 10 including said overlying activation bus lines formed from a low resistivity aluminum alloy.

13. The backplane as defined in claim 10 including an active switching device formed for each pixel, said device coupling said pixel to said row and column intersecting bus lines.

14. The backplane as defined in claim 13 including said redundant pair of activation bus lines formed overlying each device to provide a light shield therefor and to enhance the operation thereof.

15. The backplane as defined in claim 14 including each of said pixels subdivided into at least two subpixels and each said subpixel coupled in pairs to at least one of said row and one of said column intersecting bus lines with said device.

16. The backplane as defined in claim 10 including each of said pixels subdivided into at least two subpixels and each said subpixel coupled in pairs to at least one of said row and one of said column intersecting bus lines.

17. The backplane as defined in claim 16 including a redundant pair of row activation bus lines formed on said substrate for each of said subpixels.

18. The backplane as defined in claim 17 including at least one pair of said row lines interconnected at each of said pixels.

* * * * *